(12) United States Patent
Vincent et al.

(10) Patent No.: US 8,935,699 B1
(45) Date of Patent: Jan. 13, 2015

(54) CPU SHARING TECHNIQUES

(75) Inventors: Pradeep Vincent, Kenmore, WA (US);
Darek J. Mihocka, Mercer Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 324 days.

(21) Appl. No.: 13/284,703

(22) Filed: Oct. 28, 2011

(51) Int. Cl.
 G06F 9/46 (2006.01)
 G06F 9/44 (2006.01)
 G06F 9/48 (2006.01)
 G06F 9/30 (2006.01)

(52) U.S. Cl.
 CPC .......... *G06F 9/4881* (2013.01); *G06F 9/30036* (2013.01)
 USPC .......................................... 718/103; 712/244

(58) Field of Classification Search
 CPC ................... G06F 9/4881; G06F 9/30036
 USPC .......................................................... 718/103
 See application file for complete search history.

(56) References Cited

U.S. PATENT DOCUMENTS

| | | | | |
|---|---|---|---|---|
| 5,928,322 A | * | 7/1999 | Bitar et al. | 718/103 |
| 6,081,513 A | * | 6/2000 | Roy | 370/260 |
| 6,779,182 B1 | * | 8/2004 | Zolnowsky | 718/103 |
| 6,957,435 B2 | | 10/2005 | Armstrong et al. | |
| 7,685,355 B2 | * | 3/2010 | Bond | 711/6 |
| 2004/0107369 A1 | | 6/2004 | Cooper et al. | |
| 2006/0179196 A1 | * | 8/2006 | Gray | 710/240 |
| 2007/0288728 A1 | | 12/2007 | Tene et al. | |
| 2010/0205602 A1 | | 8/2010 | Zedlewski et al. | |
| 2010/0274941 A1 | * | 10/2010 | Wolfe | 710/269 |
| 2011/0179162 A1 | * | 7/2011 | Mayo et al. | 709/224 |
| 2012/0173906 A1 | | 7/2012 | Elnozahy et al. | |

OTHER PUBLICATIONS

Office Action for U.S. Appl. No. 13/284,679, mailed on Oct. 25, 2013, Pradeep Vincent, "CPU Sharing Techniques", 12 pages.
Final Office Action for U.S. Appl. No. 13/284,679, mailed on May 20, 2014, Pradeep Vincent, "CPU Sharing Techniques", 13 pages.

* cited by examiner

*Primary Examiner* — Camquy Truong
(74) *Attorney, Agent, or Firm* — Lee & Hayes, PLLC

(57) ABSTRACT

Architectures and techniques for substantially maintaining performance of hyperthreads within processing cores of processors. One technique can include determining that a first thread is scheduled for execution on one of two or more hyperthreads, where the first instruction thread has a first priority. Such a technique also includes determining that a second instruction thread is one of executing or scheduled for execution on another of the two or more hyperthreads, where the second instruction thread has a second priority that is less than the first priority The technique can further include pre-empting execution of the second instruction thread based at least in part on the second instruction thread having the second priority that is less than the first priority.

32 Claims, 7 Drawing Sheets

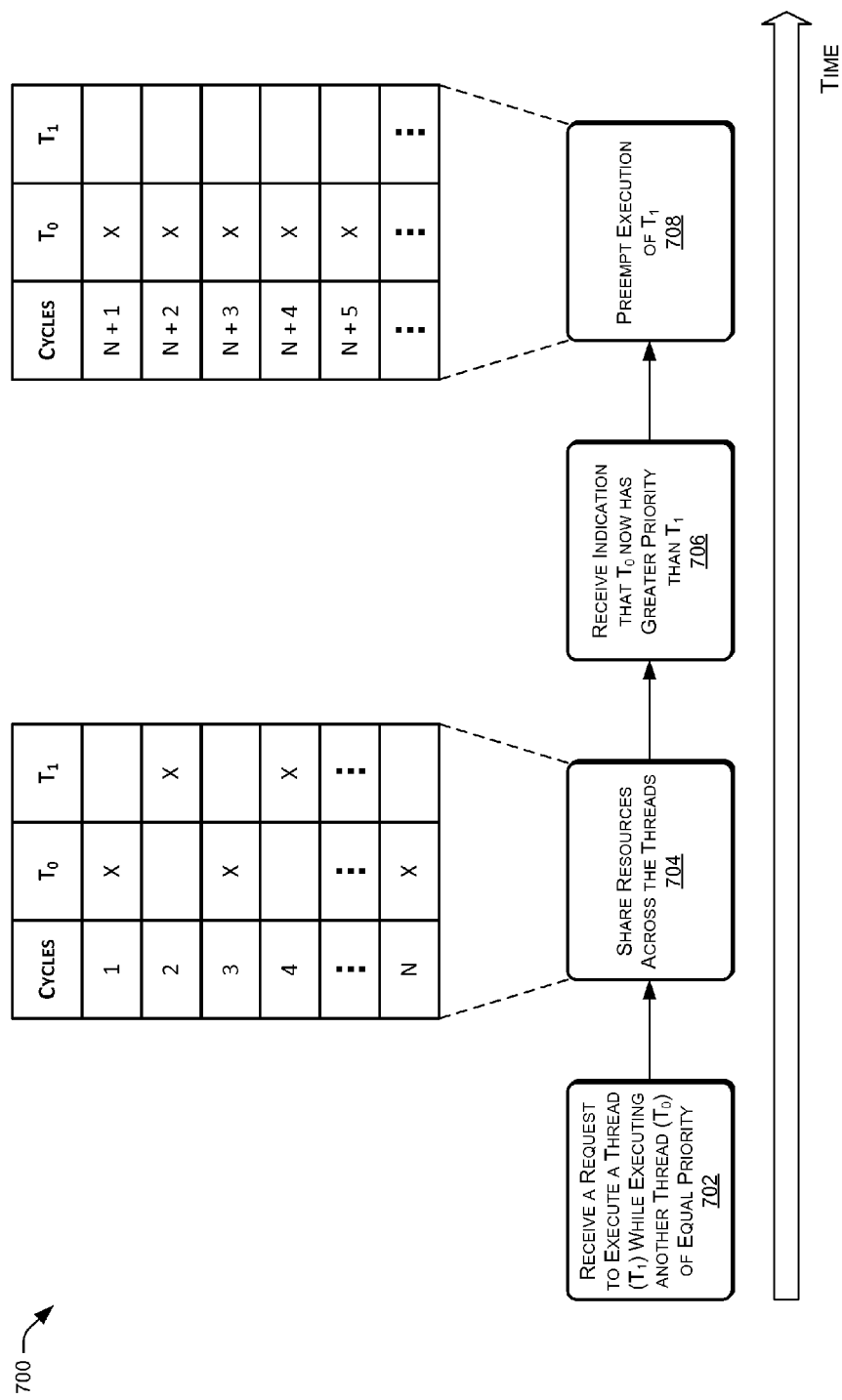

CPU SHARING TECHNIQUES

BACKGROUND

Large-scale, network-based computing represents a paradigm shift from traditional client-server computing relationships. With large-scale, network-based computing platforms (e.g., data centers), customers are able to leverage shared resources on-demand by renting resources that are owned by third parties and that reside "in the cloud." With these resources, customers of the platform are able to launch and maintain large applications without actually owning or servicing the underlying infrastructure necessary for these applications. As such, network-accessible computing platforms, often referred to as "cloud-computing platforms' or "cloud-computing environments," have expanded the class of individuals and companies able to effectively compete in the realm of computing applications.

The cloud-computing environments are generally made up of multiple computing devices that each generally includes one or more central processing units (CPU) or processors. Symmetric multithreading, also referred to as hyperthreading, allows sharing of CPU processing cores' resources across multiple hardware threads. Hyperthreading operates by allowing two or more execution contexts (CPU registers, enhanced instruction pointer (EIP), stack pointer, etc.) to share the use of a CPU processing cores' resources including load/store ports, arithmetic logic units (ALU), processor cache, and memory bandwidth access. Since most instruction streams have significant delays due to memory fetch activities, hyperthreading allows a CPU core's compute resources to be leveraged more effectively.

While hyperthreading offers a great way for sharing CPU processing cores across multiple threads, the performance impact of one hyperthread on another can be undesirable in many cases, particularly in instances where deriving consistent performance out of a hardware thread is highly desirable. Consistency of hyperthreading performance can be critical for usage in cloud-computing environments, particularly when a product model requires hyperthreads of any single processing core to be used by multiple virtual machines.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 7 illustrates an example method of preempting execution of a lower priority thread in favor of a higher priority thread executing on a common processing core.

DETAILED DESCRIPTION

Figure 1:
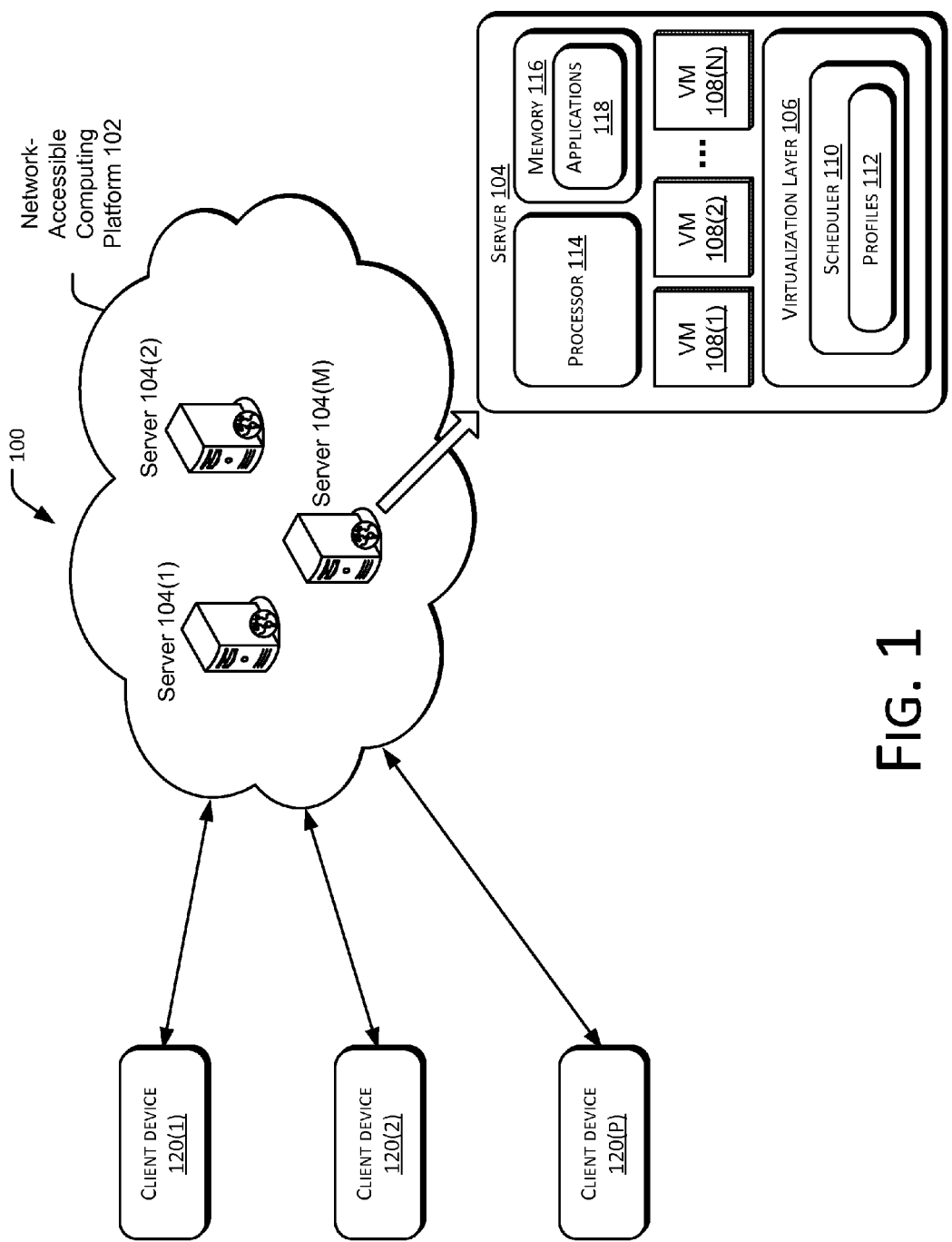
FIG. 1 illustrates an example computing environment in which hyperthreads within processing cores of processors are managed to substantially maintain performance of the hyperthreads regardless of the state of other hyperthreads.

This disclosure describes architectures and techniques for maintaining levels of performance of hyperthreads within processing cores of processors. The disclosure also describes architectures and techniques for managing hyperthreads within processing cores within processors in a shared computing environment. In accordance with various embodiments, the shared computing environment is a network-accessible computing platform (or cloud computing environment). For instance, one or more entities may host and operate a network-accessible computing platform that includes different types of network resources, such as a storage service, a load balancing service, a compute service, a security service, or any other similar or different type of network-accessible service. The services are performed using various computing devices, wherein the computing devices includes one or more processors that each include one or more processing cores configured with one or more hyperthreads.

In an embodiment, when instruction threads are being executed by hyperthreads within processing cores, it may be determined that one of the hyperthreads within a processing core has entered an idle state. In order to substantially maintain a level of performance (e.g., approximately 90%) of other hyperthreads within the processing core, an idle workload loop is executed. The idle workload loop can be determined by determining an application profile for applications executed by other, non-idled hyperthread executing on the processing core. These application profiles may indicate resources of the processing core being utilized by the non-idled threads. Therefore, by referencing the profile of the applications executing on the non-idled threads, an idle workload loop may be tailored to complement the workload of the non-idled threads. When the idled thread executes the tailored idle workload loop, the performance of the non-idled threads may remain substantially the same as prior to the idled thread entering the idle state.

In another embodiment, a level of performance for hyperthreads within a processing core can be substantially maintained by capping resource usage of the processing core with respect to the hyperthreads of the processing core. Thus, a maximum bandwidth used by each hyperthread, a maximum memory usage by each hype thread, a maximum cache usage by each hyperthread and/or a maximum functional unit usage by each hyperthread can be set for each hyperthread. By setting these maximum values, even if one or more hyperthreads within the processing core enters an idle state, active hyperthreads within the processing core cannot exceed the caps that are set and therefore, the level of performance for such hyperthreads can be substantially maintained.

In another embodiment, in order to substantially maintain a level of performance for hyperthreads, instruction threads for execution by the hyperthreads can be prioritized. Instruction threads that have a higher priority can preempt execution of instruction threads within peer hyperthreads of the processing core, thus allowing the instruction threads to be executed within the processing core without substantial interference from other instruction threads. In accordance with other embodiments, instruction threads can be moved to other processing cores such that high priority instruction threads can be executed within various processing cores while execution of lower priority instruction threads can be preempted until higher priority instruction threads have completed execution within the processing cores.

Furthermore, while the examples below describe applying the techniques at a hyperthread level, in other implementations the techniques may apply at a processing-core level. For instance, if multiple processing cores share certain resources of a common processor socket (for example, level 2/level 3 (L2/L3) cache, other memory cache, memory bandwidth, input/output (I/O) bandwidth, etc.), the techniques may maintain levels of performance of the processing cores with reference to the shared resources, even if one or more of the processing cores enter an idle state.

To illustrate, envision that two processing cores share access to a certain memory channel and a certain cache (e.g., a level three cache). When both processing cores execute a non-idle workload, each processing core may utilize some amount of the shared resources. However, when a first of the two processing cores enters an idle state or otherwise ceases execution of a non-idle workload, the techniques described herein may execute an idle workload loop on the idle processing core so as to re-create the previous contention on the shared resources and maintain a level of performance with regards to the second processing core still executing a non-idle workload.

Furthermore, the techniques for preempting hyperthreads based on priority may also apply at the processing-core level. For instance, envision that two processing cores of equal priority are executing workloads that utilize a certain set of shared resources. When one of the processing cores is assigned a higher priority (and/or when the other of the processing cores is assigned a lower priority), the higher-priority processing core may preempt the lower-priority processing core and may receive a larger amount or even sole access to the shared resources. In some instances, the lower-priority core may additionally be placed into an idle state or may be assigned a workload that is less than a workload threshold in response to the occurrence of this priority differential.

Example Architecture

FIG. 1 illustrates an environment 100 for implementing the aforementioned techniques utilizing hyperthread schedulers in a cloud-based environment. The environment of FIG. 1 includes a network-accessible platform or services provider 102 that provides network-accessible computing services via a network of computing devices represented as one or more servers 104(1), 104(2), . . . , 104(M), which may include both resources and functionality. The network-accessible platform 102 and its services may be referred to as Infrastructure as a Service (IaaS) and/or Platform as a Service (PaaS). The computing devices available to provide computing services within the network-accessible platform 102 may be in the form of dedicated servers, shared servers, virtual servers, server slices, processors, processor cycles, and so forth. While FIG. 1 illustrates the computing devices in the form of servers 104, this is not meant to be limiting and is presented as such simply for ease and clarity.

As illustrated, each of the servers 104 may include a virtualization layer 106, such as a hypervisor or a virtual machine monitor (VMM) that creates one or more virtual machines 108(1), 108(2), . . . , 108(N) for sharing resources of the server 104. As illustrated, the virtualization layer 106 may also include a scheduler 110. The scheduler 110 may generally control hyperthreads within processing cores of processors by, for example, causing idle hyperthreads to execute an idle workload loop so as to create consistent performance for other non-idling hyperthreads. In some instances, the scheduler 110 may utilize one or more application profiles 112 in determining these idle workload loops, as described in detail below. Further, while FIG. 1 illustrates the scheduler 110 as residing within the virtualization layer 106, the scheduler 110 may reside in other locations in other implementations.

Each of the servers 104 also generally includes one or more processors 114 and memory 116, which may comprise any sort of computer-readable storage media and may store one or more applications 118. The servers may also include one or more other components typically found in computing devices, such as communication connections, input/output I/O interfaces, and the like.

One or more client devices 120(1), 120(2), . . . , 120(P) communicate and interact with the network-accessible platform 102 in order to obtain computing services from the network-accessible platform 102. The client devices 120 communicate with the network-accessible platform 102 via a network such as the Internet and communication connections and I/O interfaces. Generally, the computing services from the network-accessible platform 102 are available to the client devices 120 in scalable increments or amounts, which can be dynamically increased or decreased in response to usage and/or demand. Service fees may be tied to the amount of the resources that are actually used.

The computing services available from the network-accessible platform 102 may include functional elements or services. Functional elements or services may comprise applications or sub-applications that are used as building blocks for client device applications. For example, the network-accessible platform 102 may provide predefined database functionality in the form of a discrete service that can be instantiated on behalf of a client device. Functional components may relate to network communications and other services or activities. Network-related services may, for example, include firewalls, load balancers, filters, routers, and so forth. Additional functional components may be available for such things as graphics processing, language translation, searching, etc.

The computing services may also be characterized by service types or categories, such as by the types or categories of services they provide. Different types or categories of services may include database services, web servers, firewalls, file replicators, storage services, encryption services, authentication services, and so forth. In some embodiments, services may be categorized at a relatively high level. For example, a "database services" category may include various different implementations of database services. In other embodiments, services may be categorized more specifically or narrowly, such as by type or family of database services. In embodiments such as this, for example, there may be different categories for relational databases services and non-relational database services, and for SQL and other implementations of databases services.

Service parameters for the computing services provided by the network-accessible platform 102 may correspond to options, configuration details, speeds, capacities, variations, quality-of-service (QoS) assurances/guaranties, and so forth. In the example of a database service, the service parameters may indicate the type of database (relational vs. non-relational, SQL vs. Oracle, etc.), its capacity, its version number, its cost or cost metrics, its network communication parameters, and so forth.

Figure 2:
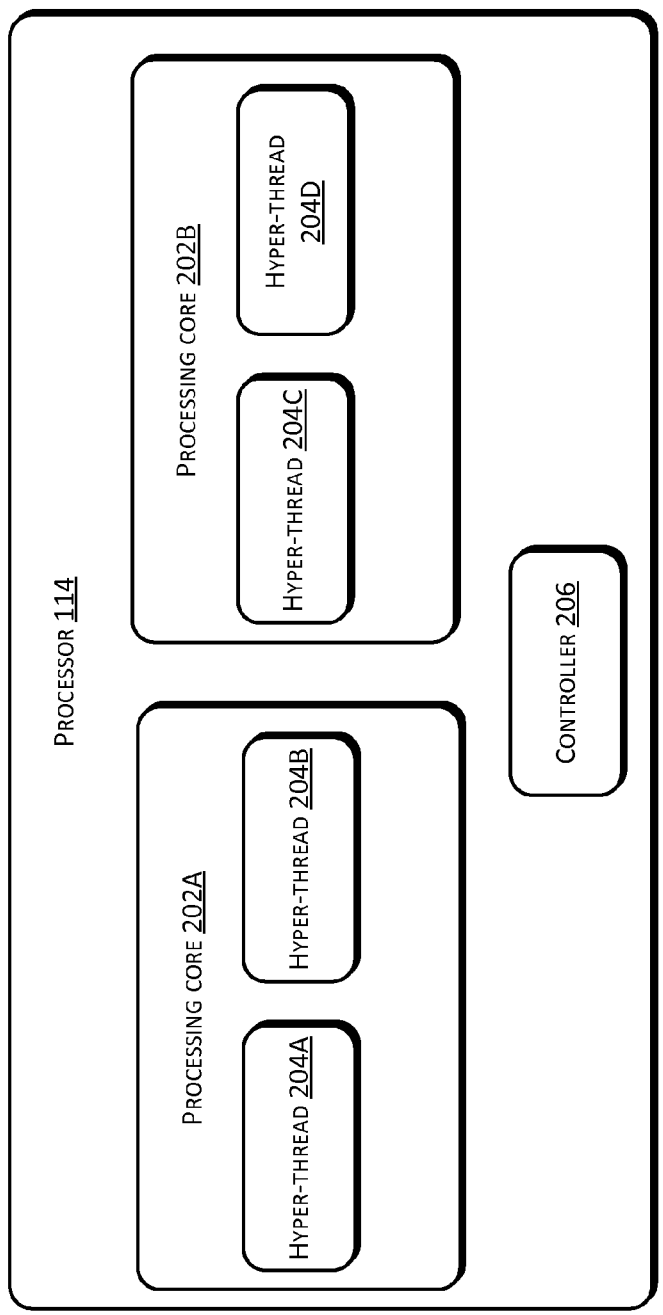
FIG. 2 illustrates an example processor used within the computing environment of FIG. 1.

FIG. 2 schematically illustrates an example of a processor 114. The processor 114 includes one or more processing cores 202. Each processing core 202 is configured with two or more hyperthreads 204. While the processor 114 is illustrated with two processing cores 202, with each processing core 202 including two hyperthreads 204, this is not meant to be limiting and is presented as such simply for clarity and ease of discussion. The processor 114 can have more or fewer processing cores and each processing core 202 can have more or fewer hyperthreads 204. The processor 114 also executes a controller block 206 for controlling various operations of the processor 114. As is known, one or more processors 114 can control various operations for themselves and/or can control various operations of other processors 114.

Each processing core 202 includes multiple resources. The multiple resources are arranged in a microarchitecture that includes, for example, ALU units, load ports, store ports, vector instruction issue ports, etc. Each of the hyperthreads 204 is configured to execute various instruction threads that may represent various applications from client devices 120. The client devices are generally represented as virtual machines 108 (VM) within the network-accessible platform 102 that provide the instruction threads for execution on the hyperthreads 204.

Example Processes

The hyperthread scheduler 110 schedules the various hyperthreads 204 to execute instruction threads from the VMs 108 based upon applications that the VMs 108 are executing. Generally, the hyperthread scheduler 110 schedules the hyperthreads such that the hyperthreads alternate execution. Thus, in the example embodiment of FIG. 2, the alternating can be an equal split between the two hyperthreads 204A, 204B, or can be a disproportionate split, such as a 70%/30% split, between the two hyperthreads 204A, 204B.

When one hyperthread, for example 204A, enters an idle state (i.e. becomes inactive), the peer hyperthread 204B on the same processing core 202A can see a performance boost due to lack of contention from the inactive hyperthread 204A. In other words, the peer hyperthread 204B will be able to use the processing core 100%. Thus, in one example, if the split between the two hyperthreads 204A, 204B is equal, then the peer hyperthread 204B may see up to a 50% boost in performance within the processing core. This can be undesirable in many instances. For example, the VM providing an instruction thread for execution on the peer hyperthread 204B, and thereby the corresponding client 120, may come to expect and desire such increased performance.

In accordance with various embodiments, in order to maintain a substantially consistent hyperthread performance, an "idle workload loop" is used on the idle hyperthread that creates an artificial contention for ALU units, load/store units and processor cache. In order to determine the amount of processing flow to use in the idle workload loop, the processing core's microarchitecture is examined in order to determine the behavior of the processing core 202 under different types of workloads, i.e. different applications. Based on the profile of applications expected to use the idle hyperthread 204 and the nature of the processing core's microarchitecture, an appropriate load for the idle workload loop can be created and used to simulate and maintain the consistency of hyperthread performance. In some instances, these profiles are pre-computed and stored in a location accessible by the scheduler 110 (e.g., as illustrated by the profiles 112 show in FIG. 1). In other instances, meanwhile, the scheduler 110 may compute a profile of an application executing on a hyperthread in real time.

In either instance, in order to determine the idle workload for an idle workload loop, the profile of at least one application is determined. The application profile is determined in terms of an expected instruction mix from instruction threads that will generally appear on either the idle hyperthread 204 or on one of the non-idle hyperthreads. The processing core's microarchitecture is also examined. Some examples of aspects of the processing core 202 that are examined are the number of ALU units, the number of load ports and cycles for each load, the number of store ports and cycles for each store, vector instruction issue ports and cycles for each instruction, and the number of hyperthreads 204 sharing each of the above resources within the processing core 202.

Figure 3:
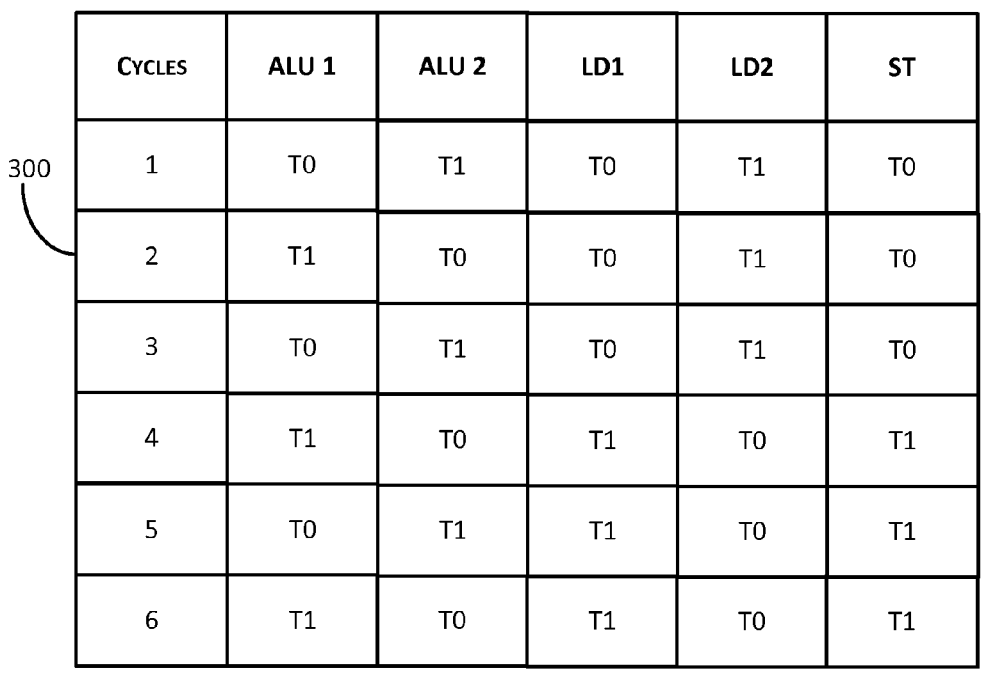
FIG. 3 is an example processing core usage timeline table for use in developing an idle workload loop to substantially maintain performance of hyperthreads.

Referring to FIG. 3, based upon the determined application profile and the processing core microarchitecture, a processing core 202 usage timeline table 300 can be created that represents resource sharing of each processing core resource in question for a sequence of clock cycles. FIG. 3 illustrates an example of a usage timeline table 300 for two hyperthreads 204 (represented in FIG. 3 as HT-0 and HT-1) executing instruction threads within a processing core 202. The example of processing core microarchitecture includes ALU1, ALU2, LD1, LD2, and a store unit. For the example of FIG. 3, the ALUs alternate between the hyperthread HT-0 and the hyperthread HT-1, every cycle. Load units LD1, LD2 and the store unit alternate between the hyperthreads HT-0, HT-1 every three cycles, which assumes that three clock cycles are required for a load operation.

If in this example HT-1 is to be idle loaded so that HT-0 sees a consistent performance within the processing core 202, an idle loop workload is developed such that instruction-level parallelism (ILP) generated by a idle workload loop occupies each of the processing core units per the timeline table 300 illustrated in FIG. 3. As an example, interleaved pointer chasing can be used to occupy the load unit and the number of such interleaved pointer chasing in the code for the idle workload loop will determine the ILP that directly dictates the number of units used by the code in parallel. Similarly, pointer deference and assignment will result in the store unit being fully utilized. Thus, an appropriate code for creating an idle loop workload for the example illustrated in FIG. 3 will generate ILP that will occupy one ALU unit, one store unit, and one load unit.

To illustrate, envision that the processing core 202 provides resources to HT-1 a certain percentage of the time and provides resources to HT-0 for the remaining percentage. In these instances, when HT-1 becomes inactive (i.e., goes idle), an idle workload loop begins simulating the workload of HT-1. As such, HT-0 will not see an increase in performance. In other words, the idle workload loop will continue to operate in place of HT-1 and, thus, the processing core 202 will provide approximately the same amount of resources to HT-0 as the amount provided to HT-0 prior to HT-1 entering the idle state. In some instances, the idle workload loop is of sufficient complexity so as to avoid the scheduler 110 from causing the hyperthread to enter an idle state as opposed to executing the idle workload loop.

In accordance with various embodiments, when a hyperthread has completed execution of its instruction thread and a peer hyperthread has been executing an idle workload loop, the hyperthread scheduler 110 can instruct the peer hyperthread that is executing the idle workload loop to simply enter an idle state and stop executing the idle workload loop. If all hyperthreads within the processing core are in idle state, then the processing core itself can enter an idle state, which conserves power. In other instances, meanwhile, the idle workload itself can poll for the status of the hyperthread in order for the idle workload to determine whether or not to continue executing.

In accordance with various embodiments, the architecture of the processor 114 and the processing cores 202 within the processor 114 can be configured to cap performance for hyperthreads 204 operating within the processing cores 202.

Such capping for use of resources within the processing cores 202 will help allow for hyperthreads 204 to maintain a substantially consistent performance within the processing cores 202, regardless of whether or not peer hyperthreads 204 are operating or idle within the processing cores 202.

More particularly, the processor architecture can be configured to include a number of per hyperthread capping parameters that are used to cap various processing core resources used by a particular hyperthread. Examples of thread capping parameters include memory bandwidth used, memory usage bursts, cache usage, functional units that can be used, etc. Thus, for example, if a processing core 202 has four load ports available for use by the hyperthreads 204, the number of ports that can be used by a particular hyperthread 204 can be capped at three. Another hyperthread 204 can be capped at two. Thus, for example, even if peer hyperthreads 204 are not using all of the load ports and a fourth load port is available for the capped hyperthreads 204, the capped hyperthreads 204 can still only use three and two load ports, respectively, due to the capping restrictions.

As another example, the memory can be controlled such that only a certain number of memory requests can be in flight at any given time within the pipeline of the processing core 202. Thus, if for example the number of memory requests allowed is thirty, then even if fewer peer hyperthreads 204 are operating within the processing core 202, a particular hyperthread 204 cannot launch more memory requests if a request will cause the total number of memory requests within the processing core 202 to exceed thirty. Additionally, the number of memory requests can be capped for each hyperthread 204. The controller 206 within processor 114 can be configured to control the various caps for the processing cores 202 and hyperthreads 204.

In accordance with various embodiments, in order to maintain a substantially consistent performance for hyperthreads 204 within processing cores 202, it may be useful to prioritize some applications for execution on hyperthreads with respect to others. Indeed, in some cases very high priority applications from virtual machines 108 within the network-accessible platform 102 will be sharing processing core resources and hyperthreads with other low priority applications. When a high priority application is utilizing a processing core 202 or hyperthread 204, the interference from low priority applications executing elsewhere in the cloud 102 may need to be minimized or even eliminated in order to insure that the high priority application achieves a consistent performance. An application may be deemed high priority for various reasons, such as the application relating to security, the application being time sensitive, etc. Additionally, instruction threads can be deemed to be high priority regardless of whether the corresponding application is deemed high priority. Furthermore, certain threads may be deemed low priority for an array of reasons. For instance, threads that are solely intended to utilize unused capacity (e.g., leftover CPU) on the processing core 202 may be deemed low priority.

In an embodiment, if a high priority application is executing on a particular hyperthread 204 A within processing core 202A, the peer hyperthread 204B within processing core 202A within the processor 114 can be deliberately kept unoccupied to prevent any cross-hyperthread interference. Such an idea, in various embodiments, can be expanded to multiple processing cores 202 within a processor 114 that might include shared level 2/level 3 (L2/L3) cache, a shared memory controller and/or shared memory access.

In particular, in accordance with various embodiments, if a high priority instruction thread (e.g., from a high priority application) is scheduled on a particular hyperthread 204A within processing core 202A, the peer hyperthread 204B within the processing core 202A is checked to see if it is executing or is scheduled to execute a low priority instruction thread (e.g., from a low priority application). If a low priority thread is executed, the hyperthread scheduler 110 can determine if the low priority peer thread should be preempted. The determination can be based upon relative priority difference, historical behavior of the low priority thread using the peer hyperthread 204B and/or a user specified indication, e.g., the client device 120 that is responsible for the low priority thread indicating that execution can be delayed. The indication can be pre-ordained by the client device 120 or can be in response to an inquiry from the network-accessible platform 102. The priorities for various instruction threads can be set based upon various scales. In general, there are usually several hundred levels of priority that can be assigned to an instruction thread. High priority and low priority can be defined in many ways depending upon applications, users and system operators. For example, depending upon the levels of priority, high priority can be the top third levels of priority and low priority can be the bottom third levels of priority, while the middle third levels of priority can be deemed to be neither high nor low.

If it is determined to preempt the peer hyperthread 204B, then the hyperthread scheduler 110 can issue an interprocess interrupt (IPI) to interrupt the peer hyperthread 204B. Alternatively, the peer hyperthread 204B can be marked to be idle when it gets an opportunity, which typically occurs at the next timer interrupt, a next hypercall, or the next virtual machine event generally. The peer hyperthread 204B within the processing core 202A responds by moving to a "restricted scheduling" mode. This generally means that the hyperthread 204B is idled. Alternatively, a different instruction thread that might be more hyperthread peer friendly could be executed. In other words, the more hyperthread peer friendly thread would utilize resources within the hyperthread 204B that would not interfere very much with the high priority thread resource use in hyperthread 204A.

In accordance with various embodiments, the selection of a more friendly instruction thread for operation on the peer hyperthread 204B can involve moving instruction threads among various processing cores 202. For example, if two relatively high priority instruction threads are executing or scheduled to execute on hyperthreads 204A, 204B, respectively, and two relatively low priority instruction threads are executing or scheduled to execute on hyperthreads of another processing core, i.e. hyperthreads 204C, 204D of processing core 202B, then one of the high priority instruction threads can be moved from the first processing core 202A to the second processing core 202B, while one of the low priority threads can be moved from the second processing core 202B to the first processing core 202A. In particular, the hyperthread scheduler 110 can send an interrupt to the second processing core 202B and the two instruction threads, a high priority instruction thread and a low priority instruction thread, can be switched between the first processing core 202A and the second processing core 202B. Once the interrupt is lifted, processing core 202A executes a high priority instruction thread on one of the hyperthreads 204A, B and processing core 202B executes a high priority instruction thread on one of hyperthreads 204C, D while the other two hyperthreads and the two low priority threads are idled.

When a high priority instruction thread completes execution, apart from selecting a task for itself, the hyperthread scheduler 110 sends a signal to the peer hyperthread to make it aware that it doesn't have to perform restricted scheduling anymore. The peer hyperthread responds by moving out of restricted scheduling mode and resumes a normal scheduling mode that can include low priority instruction threads.

In general, there are various methods for indicating that hyperthreads and processing cores are idling. For example, a flag can be used to indicate that a hyperthread or processing core is idling. Additionally, bit maps can be utilized in order to indicate that a hyperthread or a processing core is currently idling. For example, two bit maps can be utilized, one for hyperthreads and one for processing cores. The hyperthread scheduler 110 or controller 206 within the processor 114 can utilize either the bit maps or flags in order to determine and control which hyperthreads and processing cores are idling.

Figure 4:
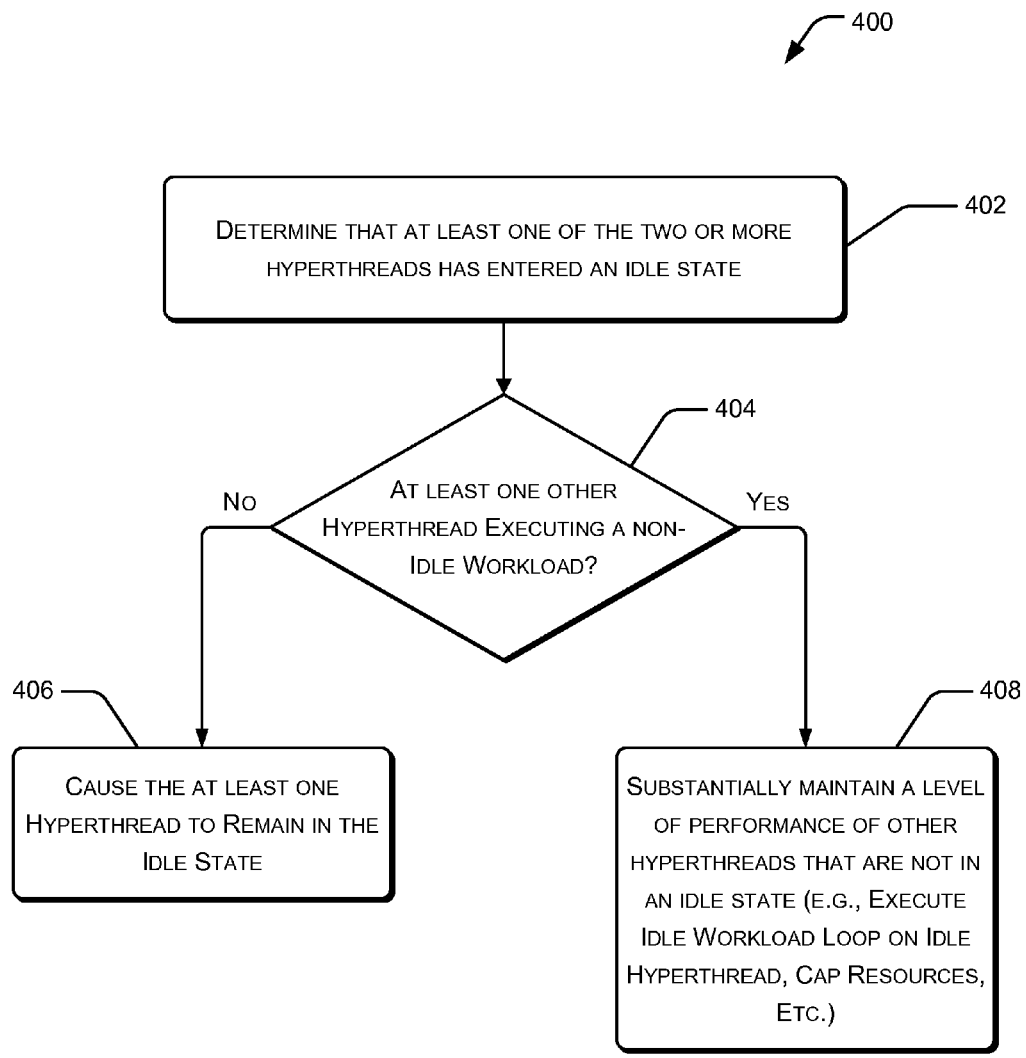
FIG. 4 illustrates an example method of substantially maintaining performance of hyperthreads within the computing environment of FIG. 1.
Figure 5:
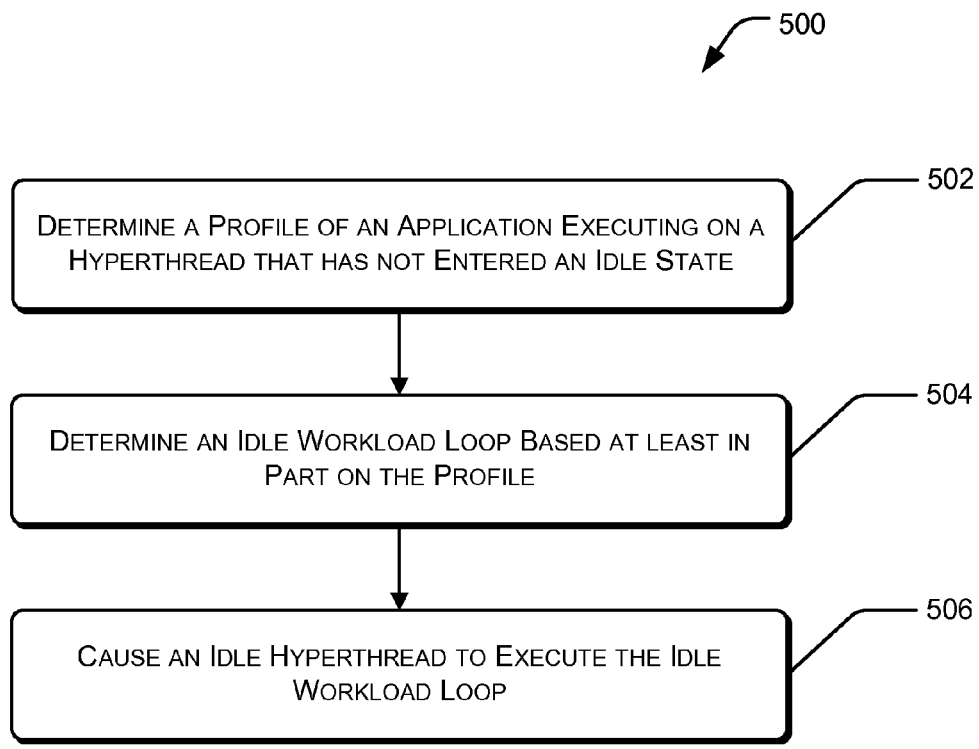
FIG. 5 illustrates an example method of determining a profile an application, determining an idle workload loop based at least in part on the profile, and then implementing the idle workload loop on at least one idle hyperthread.

FIGS. 4 and 5 are example processes that the architecture 100 of FIG. 1 may implement. This process (as well as other processes described throughout) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Furthermore, while the architectures and techniques described herein have been described with respect to network-accessible platforms, the architectures and techniques are equally applicable to processors, processing cores and hyperthreads in other environments and computing devices.

FIG. 4 illustrates a method 400 for managing two or more hyperthreads within a processing core within a shared computing environment. At 402, the method includes determining that at least one of the two or more hyperthreads has entered an idle state. At 404, the method 400 determines whether at least one other hyperthread executing on the processing core is executing a non-idle workload (e.g., is not in an idle state or running an idle workload loop). If not (i.e., if no hyperthreads are currently executing a non-idle workload on the processing core), then at 406 the method 400 causes the at least one hyperthread that entered the idle state to remain in the idle state.

If, however, at least one hyperthread is executing a non-idle workload, then at 408 the method substantially maintains a level of performance of the other hyperthreads of the two or more hyperthreads that are not in an idle state. By maintaining performance of these hyperthreads in this manner, the method 400 avoids these hyperthreads from experiencing a large boost in performance and, hence, an inconsistent experience on the whole. In some instances, the method 400 substantially maintains the performance by causing the hyperthread that just entered the idle state to execute an idle workload loop. In other instances, meanwhile, the method 400 may cap resources of the processing core available to the hyperthreads that are not in the idle state.

FIG. 5 illustrates an example method 500 of determining a profile an application, determining an idle workload loop based at least in part on the profile, and then implementing the idle workload loop on at least one idle hyperthread. In some instances, the scheduler 110 of FIG. 1 may implement the method 500 after determining that a hyperthread has entered an idle state and for the purpose of substantially maintaining a level of performance of other non-idling hyperthreads that are executing on a common processing core.

At 502, the method 500 determines a profile of an application executing on a hyperthread that has not entered an idle state. For instance, the scheduler 110 may identify a particular application running on the hyperthread and identify, from a pre-computed list of profiles 112, the profile of the application. In other instances, meanwhile, the scheduler 110 may, in real time, compute the profile of the identified application.

In either instance, at 504 the method 500 determines an idle workload loop based at least in part on the determined profile. Finally, at 506 the method 500 may cause an idle hyperthread to execute the idle workload loop. By doing so, the method 500 substantially maintains the performance of the non-idled hyperthreads on the common processing core.

Figure 6:
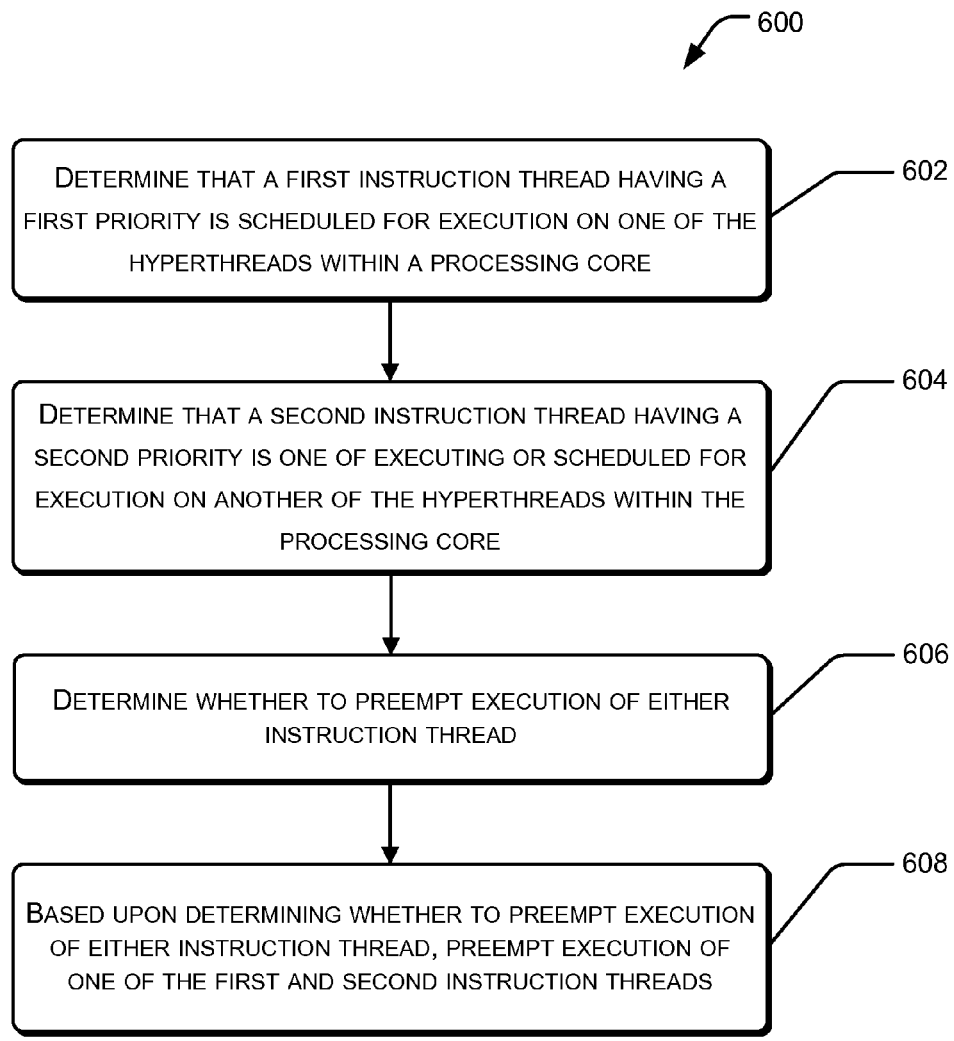
FIG. 6 illustrates another example method of substantially maintaining performance of hyperthreads within the computing environment of FIG. 1.

FIG. 6 illustrates a method 600 for managing two or more hyperthreads within a processing core within a shared computing environment. At 602, the method 600 includes determining that a first instruction thread having a first priority is scheduled for execution on one of the hyperthreads within a processing core. At 604, the method includes determining that a second instruction thread having a second priority is one of executing or scheduled for execution on another of the hyperthreads within the processing core. At 606, the method 600 includes determine whether or not to preempt execution of either of the instruction threads. At 608, the method 600 includes preempt, based upon the determining, execution of one of the first and second instruction threads. In some instances, the preempting includes causing the preempted thread to enter an idle state or causing the preempted thread to execute a workload that is less than a threshold workload. In the latter instances, the method 600 may assign a "scavenger workload" to the thread that simply utilizes unused resources, such as unused memory cycles, leftover CPU, or the like. By executing this workload that is less than the threshold workload, the preempted thread does not interfere with execution of the higher-priority thread.

FIG. 7 illustrates an example method 700 of preempting execution of a lower priority thread in favor of a higher priority thread executing on a common processing core. At 702, the method 700 receives a request to execute, on a processing core, a thread, $T_1$, while already executing a thread, $T_0$, of equal priority on the processing core. At 704, the method 700 shares resources of the processing core across the two threads of equal priority. In this illustrated example, the workloads on the respective hyperthreads contend heavily for resources of the processor. As such, FIG. 7 illustrates that the method 700 may share cycles equally across the two threads, such that one thread is essentially stalled while the other thread executes for a particular cycle. Of course, while FIG. 7 illustrates sharing the threads in this manner, other implementations may share the resources of the physical processor in any other manner.

At 708, the method receives an indication that $T_0$ now has a greater priority that $T_1$. This indication may represent $T_0$ being assigned a higher priority, $T_1$ being assigned a lower priority, or a combination thereof. In any of these instances, at 708 the method 700 preempts execution of $T_1$. Preempting execution of $T_1$ may cause $T_1$ to enter an idle state or to execute a workload that is less than a threshold workload. As such, FIG. 7 illustrates that the method 700 now allocates each available cycle to the higher-priority thread, $T_0$. However, while FIG. 7 illustrates assigning a higher-priority thread each available cycle, other implementations may allocate these cycles in any other manner in response to the indication received at 706.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method for managing two or more hyperthreads within a single processing core within a shared computing environment, the method comprising:
under control of one or more processors configured with executable instructions,
determining that a first instruction thread is scheduled for execution on one of the two or more hyperthreads within the single processing core, the first instruction thread having a first priority;
determining that a second instruction thread is one of executing or scheduled for execution on another of the two or more hyperthreads within the single processing core, the second instruction thread having a second priority that is less than the first priority;
preempting execution of the second instruction thread based at least in part on the second instruction thread having the second priority that is less than the first priority, the preempting including causing the second instruction thread to execute a workload on the another of the two or more hyperthreads within the single processing core that is less than a threshold workload; and
while the second instruction thread executes the workload on the another of the two or more hyperthreads within the single processing core that is less than a threshold workload, causing the first instruction thread to execute on the one of the two or more hyperthreads within the single processing core.

2. The method of claim 1, wherein preempting of the execution of the second instruction thread comprises sending an interrupt to the another of the two or more hyperthreads within the single processing core.

3. The method of claim 1, wherein preempting of the execution of the second instruction thread comprises flagging the another of the two or more hyperthreads within the single processing core for idling at a next opportunity.

4. The method of claim 3, wherein the next opportunity is a next timer interrupt, a next hypercall, or a next virtual machine event.

5. The method of claim 1, wherein preempting of the execution of the second instruction thread further comprises moving the another of the two or more hyperthreads within the single processing core to a restricted scheduling mode.

6. The method of claim 5, wherein the restricted scheduling mode comprises executing a third instruction thread on the another of the two or more hyperthreads within the single processing core, the third instruction thread having a third priority that is also less than the first priority.

7. The method of claim 5, further comprising, upon completion of executing the first instruction thread, requesting that the another of the two or more hyperthreads within the single processing core cease the restricted scheduling mode.

8. The method of claim 7, further comprising in response to the requesting, moving the another of the two or more hyperthreads within the single processing core out of the restricted scheduling mode.

9. A method for managing hyperthreads within processing cores within a shared computing environment, the method comprising:
under control of one or more processors configured with executable instructions:

determining that a first instruction thread having a first priority is scheduled for execution on one of the hyperthreads within a single processing core;
determining that a second instruction thread having a second priority is one of executing or scheduled for execution on another of the hyperthreads within the single processing core;
determining whether to preempt execution of either instruction thread;
based upon determining whether to preempt execution of either instruction thread, preempting execution of one of the first and second instruction threads, the preempting including causing the one of the first and second instruction threads to execute a workload on the another of the hyperthreads within the single processing core that is less than a threshold workload; and
while the one of the first and second instruction threads executes the workload on the another of the hyperthreads within the single processing core that is less than a threshold workload, causing the first instruction thread having the first priority to execute on the one of the hyperthreads within the single processing core.

10. The method of claim 9, wherein determining whether to preempt execution of either instruction thread comprises receiving an indication from a user.

11. The method of claim 9, wherein determining whether to preempt execution of either instruction thread comprises evaluating a historical behavior of one of the instruction threads.

12. The method of claim 11, wherein the first priority is higher than the second priority and evaluating a historical behavior of one of the instruction threads comprises evaluating the historical behavior of the second instruction thread.

13. The method of claim 9, wherein determining whether to preempt execution of either instruction thread comprises comparing the first priority with the second priority.

14. The method of claim 13, wherein if based upon comparing the first priority with the second priority it is determined that the first priority and the second priority are substantially equal, then:
preempting execution of one of the first and second instruction threads comprises:
sending an interrupt to another processing core within the shared computing environment, wherein the another processing core has at least two instruction threads executing or scheduled for execution on at least two hyperthreads of the another processing core, and wherein the at least two instruction threads each have priorities that are lower than the first and second priorities;
moving one of the first and second instruction threads to the another processing core;
moving one of the at least two instruction threads to the single processing core;
idling the at least two instruction threads; and
executing the first and second instruction threads.

15. An apparatus comprising:
one or more processors; and
memory accessible by the one or more processors, the memory including instructions that, when executed, cause the one or more processors to:
determine that a first instruction thread having a first priority is scheduled for execution on one of a plurality of hyperthreads within a single processing core within one of the one or more processors;
determine that a second instruction thread having a second priority is one of executing or scheduled for execution on another of the plurality of hyperthreads within the single processing core within the one of the one or more processors;

determine whether to preempt execution of either instruction thread;

based upon determining whether to preempt execution of either instruction thread, preempt execution of one of the first and second instruction threads, the preempting including causing the one of the first and second instruction threads to execute a workload on the another of the plurality of hyperthreads within the single processing core within the one of the one or more processors that is less than a threshold workload; and while the one of the first and second instruction threads executes the workload on the another of the plurality of hyperthreads within the single processing core within the one of the one or more processors that is less than a threshold workload, cause the first instruction thread having a first priority to execute on the one of the plurality of hyperthreads within the single processing core within the one of the one or more processors.

16. The apparatus of claim 15, wherein the instructions further include:

if based upon comparing the first priority with the second priority it is determined that the first priority and the second priority are substantially equal, then:

preempting execution of one of the first and second instruction threads comprises:

sending an interrupt to another processing core, wherein the another processing core has at least two instruction threads executing or scheduled for execution on at least two hyperthreads of the another single processing core, and wherein the at least two instruction threads each have priorities that are lower than the first and second priorities;

moving one of the first and second instruction threads to the another processing core;

moving one of the at least two instruction threads to the single processing core;

idling the at least two instruction threads; and executing the first and second instruction threads.

17. An apparatus comprising:

one or more processors; and memory accessible by the one or more processors, the memory including instructions that, when executed, cause the one or more processors to:

determine that a higher priority instruction thread is scheduled for execution on one of two or more hyperthreads within a single processing core within one of the one or more processors;

determine that a lower priority instruction thread is one of executing or scheduled for execution on another of the two or more hyperthreads within the single processing core within the one of the one or more processors;

preempt execution of the lower priority instruction thread, the preempting including causing the lower priority instruction thread to execute a workload on the another of the two or more hyperthreads within the single processing core within the one of the one or more processors that is less than a threshold workload; and while the lower priority instruction thread executes a workload on the another of the two or more hyperthreads within the single processing core within the one of the one or more processors that is less than a threshold workload, cause the higher priority instruction thread to execute on the one of two or more hyperthreads within the single processing core within the one of the one or more processors.

18. The apparatus of claim 17, wherein preempting execution of the lower priority instruction thread is performed by sending an interrupt to the another of the two or more hyperthreads.

19. The apparatus of claim 17, wherein preempting execution of the lower priority instruction thread is further performed by moving the another of the two or more hyperthreads to a restricted scheduling mode.

20. The apparatus of claim 19, wherein the restricted scheduling mode comprises executing a different lower priority instruction thread on the another of the two or more hyperthreads.

21. The apparatus of claim 19, wherein the instructions further cause the one or more processors to, upon completion of executing the higher priority instruction thread, request that the another of the two or more hyperthreads cease the restricted scheduling mode.

22. The apparatus of claim 21, wherein the instructions further cause the one or more processors to, in response to the requesting, move the another of the two or more hyperthreads out of the restricted scheduling mode.

23. The apparatus of claim 17, wherein preempting execution of the lower priority instruction thread is performed by flagging the another of the two or more hyperthreads for idling at a next opportunity.

24. The apparatus of claim 23, wherein the next opportunity is a next timer interrupt, a next hypercall, or a next virtual machine event.

25. One or more computing devices comprising:

one or more processors; and memory, wherein the memory includes a plurality of instructions configured to cause, when executed, the one or more processors to:

determine that a higher priority instruction thread is scheduled for execution on one of two or more hyperthreads within a single processing core within one of the one or more processors;

determine that a lower priority instruction thread is one of executing or scheduled for execution on another of the two or more hyperthreads within the single processing core within the one of the one or more processors;

preempt execution of the lower priority instruction thread, the preempting including causing the lower priority instruction thread to execute a workload on the another of the two or more hyperthreads within the single processing core within the one of the one or more processors that is less than a threshold workload; and while the lower priority instruction thread executes a workload on the another of the two or more hyperthreads within the single processing core within the one of the one or more processors that is less than a threshold workload, cause the higher priority instruction thread to execute on the one of the two or more hyperthreads within the single processing core within one of the one or more processors.

26. The one or more computing devices of claim 25, wherein preempting execution of the lower priority instruction thread comprises sending an interrupt to the another of the two or more hyperthreads within the single processing core of the one of the one or more processors.

27. The one or more computing devices of claim 25, wherein preempting execution of the lower priority instruction thread comprises flagging the another of the two or more hyperthreads within the single processing core of the one of the one or more processors for idling at a next opportunity.

28. The one or more computing devices of claim 27, wherein the next opportunity is a next timer interrupt, a next hypercall, or a next virtual machine event.

29. The one or more computing devices of claim 25, wherein preempting execution of the lower priority instruction thread further comprises moving the another of the two or more hyperthreads within the single processing core of the one of the one or more processors to a restricted scheduling mode.

30. The one or more computing devices of claim 29, wherein the restricted scheduling mode comprises executing a different lower priority instruction thread on the another of the two or more hyperthreads within the single processing core of the one of the one or more processors.

31. The one or more computing devices of claim 29, wherein the instructions are further configured to cause, when executed, upon completion of executing the higher priority instruction thread, request that the another of the two or more hyperthreads within the single processing core of the one of the one or more processors cease the restricted scheduling mode.

32. The one or more computing devices of claim 31, wherein the instructions are further configured to cause, when executed, the one or more processors to, in response to the requesting, move the another of the two or more hyperthreads within the single processing core of the one of the one or more processors out of the restricted scheduling mode.

\* \* \* \* \*